United States Patent [19]

Nagashima et al.

[11] Patent Number: 4,896,923
[45] Date of Patent: Jan. 30, 1990

[54] DUAL HYDRAULIC BRAKE SYSTEM

[75] Inventors: Takashi Nagashima, Koda; Eiji Miura, Kariya, both of Japan

[73] Assignee: Aisin Seiki Kabushiki Kaisha, Kariya, Japan

[21] Appl. No.: 250,330

[22] Filed: Sep. 28, 1988

[30] Foreign Application Priority Data

Sep. 30, 1987 [JP] Japan .......................... 62-149792[U]

[51] Int. Cl.$^4$ ................................................ B60T 8/26
[52] U.S. Cl. .................................. 303/9.63; 303/9.71; 303/9.75
[58] Field of Search ..................... 303/9.62, 9.63, 9.71, 303/9.72, 9.73, 9.75, 9.76, 84.1; 188/349

[56] References Cited

U.S. PATENT DOCUMENTS

| | | | |
|---|---|---|---|
| 3,937,523 | 2/1976 | Ayers, Jr. et al. | 188/349 X |
| 3,945,686 | 3/1976 | Orzel | 188/349 X |
| 4,004,839 | 1/1977 | Burgdorf | 303/9.63 |
| 4,217,004 | 8/1980 | Kawaguchi | 303/9.63 |
| 4,279,448 | 7/1981 | Berisch | 303/9.63 |

FOREIGN PATENT DOCUMENTS

| | | | |
|---|---|---|---|
| 0015193 | 4/1974 | Japan | 303/9.63 |
| 0016076 | 2/1979 | Japan | 303/9.63 |
| 0020552 | 2/1983 | Japan | 303/9.72 |
| 1248867 | 8/1986 | U.S.S.R. | 188/349 |

Primary Examiner—Andres Kashnikow
Assistant Examiner—Timothy Newholm
Attorney, Agent, or Firm—Burns, Doane, Swecker & Mathis

[57] ABSTRACT

A proportioning valve is interposed between a master cylinder and rear wheel cylinders and includes a housing within which are accommodated a piston with a valve head, an opposed valve seat thereby and a spring urging the piston to thereby remove the valve head from the valve seat. The valve head and the valve seat cooperate to open and close the fluid circuit between the master cylinder and the rear wheel cylinder to reduce the hydraulic pressure when the hydraulic pressure delivered from the master cylinder exceeds a set value. In order to supply hydraulic pressure from the master cylinder to the rear wheel cylinders when fluid leakage or the like occurs at the front wheel side, a sleeve enclosing the spring in the housing is brought into engagement with the piston to prevent engagement of the valve head and the valve seat.

3 Claims, 3 Drawing Sheets

DUAL HYDRAULIC BRAKE SYSTEM

BACKGROUND OF THE INVENTION

1. Field of the Invention

The present invention relates to a dual hydraulic brake system for a vehicle, and in particular to a dual hydraulic brake system in which a proportioning valve is positioned between a master cylinder and rear wheel cylinders of the vehicle.

2. Description of the Prior Art

A conventional dual hydraulic brake system is disclosed in Japanese Patent Publication No. 49-15193 issued on Apr. 12, 1974. In the conventional dual hydraulic brake system which is depicted in FIG. 4, when hydraulic pressure supplied to a first inlet port of a proportioning valve from a master cylinder exceeds a set value during the braking operation, a valve head formed on a piston cooperates with a valve seat to open and close a first fluid circuit periodically, thereby proportionally reducing the hydraulic pressure supplied to the rear wheel cylinders.

In order to obtain a fully effective and safe braking operation even in the event of fluid leakage in a fluid circuit which connects the master cylinder and the front wheel cylinders, the pressure supplied to the proportioning valve is transmitted directly to the rear wheel cylinders without being reduced. In other words, when the hydraulic pressure, which is supplied to a second inlet port of the proportioning valve and which is equal to the pressure at each of the front wheel cylinders, drops, a sleeve moves in a rightward direction (as shown in the drawing) against a spring and is brought into engagement with a stepped portion of the piston. Due to the resulting engagement between the sleeve and the stepped portion of the piston, the piston is prevented from moving in a leftward direction (as shown in the drawing), thereby permitting direct transmission of the hydraulic pressure from the first inlet port to the rear wheel cylinders.

However, since the sleeve and the spring are arranged in series in the proportioning valve, the length of the valve in the axial direction must be increased in order to accommodate the spring and the sleeve.

SUMMARY OF THE INVENTION

It is, therefore, a principal object of the present invention to provide a dual hydraulic brake system without the aforementioned drawback.

Another object of the present invention is to provide a dual hydraulic brake system in which a proportioning valve is shorter in the axial direction in comparison with conventional proportioning valves.

To achieve the aforementioned objects and in accordance with the purposes of the present invention, a dual hydraulic system is comprised of a brake master cylinder that is capable of delivering hydraulic pressures separately to a first fluid circuit and a second fluid circuit, front wheel cylinders associated with respective front wheels and fluidly connected to the second fluid circuit, rear wheel cylinders associated with respective rear wheels, and valve means interposed between the first fluid circuit and the rear wheels to operate in such a manner that the hydraulic pressure which is supplied to the rear wheels is proportionally reduced when the hydraulic pressure exceeds a set value. The valve means comprises a housing, a bore formed in the housing, an outlet port formed at one side of the housing to establish fluid communication with the bore and the rear wheel cylinders, a first inlet port formed at a portion of the housing for establishing fluid communication between the bore and the first fluid circuit, a piston with a valve head, a valve seat opposed to the valve head, a spring engaged at one end thereof with a portion of the piston to move the valve head away from the valve seat, and a sensing means for sensing fluid leakage or the like in the second fluid circuit. A sleeve is slidably mounted in the bore, enclosing the spring, receiving the other end of the spring, and movable towards the piston to assure the removal of the valve head from the valve seat upon actuation of the sensing means.

BRIEF DESCRIPTION OF THE DRAWINGS

The above and other objects, features and advantages of the present invention will become apparent and more readily appreciated from the following detailed description of the preferred exemplary embodiments of the present invention, taken in connection with the accompanying drawings, in which.

DETAILED DESCRIPTION OF THE PREFERRED EMBODIMENTS

Figure 1:
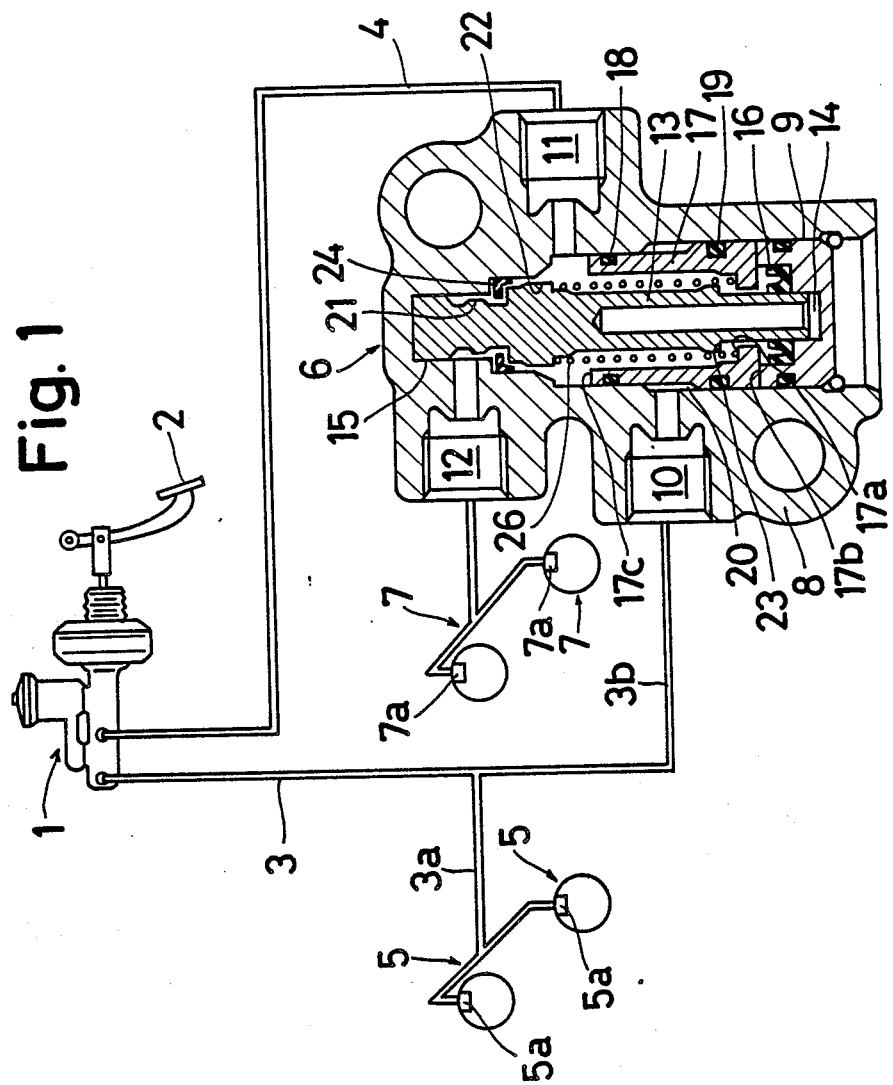
FIG. 1 is a view illustrating a dual hydraulic brake system.

Referring initially to FIG. 1, a master cylinder 1 connected with a foot-pedal operator 2 is in fluid communication with a first inlet port 11 of a proportioning valve 6 via a first fluid circuit 4. The master cylinder 1 is also in fluid communication with front wheel cylinders 5a and 5a, each of which is associated with a front wheel 5, via a branched conduit 3a of a second fluid circuit 3. A branched conduit 3b of the second fluid circuit 3 is in fluid communication with a second inlet port 10 of the proportioning valve 6. Thus, in response to the depression of the foot pedal 2, the same hydraulic pressure is delivered from the master cylinder 1 to the first inlet port 11, the second inlet port 10 and the front wheel cylinders 5a and 5a.

In a housing 8 to which the first inlet port 11 is connected, there is formed a stepped bore 15 having a larger-radius portion 15a, a smaller-radius portion 15b and a shoulder 15c formed therebetween. The smaller-radius portion 15b of the stepped bore 15 is positioned at an upper side (as shown in the drawing) of the housing 8. A plug 9 having a concave portion 14 oriented in the upward direction is tightly fitted in an open end of the larger-radius portion 15a of the stepped bore 15. A piston 13 is positioned in the bore 15 so that opposite ends of the piston 13 are slidably supported in the smaller-radius portion 15b of the stepped bore 15 and the concave portion 14 of the plug 9 respectively. A cup-seal 16 is positioned to assure fluid-tightness between the bore 15 and the concave portion 14 of the plug 9. A protrusion defining a valve head 21 is formed on the piston 13 near an upper end thereof and is in opposition to a valve seat 24 provided at the shoulder 15c of the stepped bore 15. In the position shown in FIG. 1, the valve head 21 is disengaged from the valve seat 24 so that the hydraulic pressure supplied to the first inlet portion 11 may be transmitted to rear wheel cylinders 7a and 7a, each of which is associated with a rear wheel 7, through the bore 15, through a passage between the valve head 21 and the valve seat 24 and through an outlet port 12 formed at an upper side of the housing 8. However, when hydraulic pressure supplied to the first inlet port 11 exceeds a set value during the braking operation, the valve head 21 on the piston 13 and the valve seat 24 cooperate to periodically open and close the first fluid circuit 4, thereby proportionally reducing the hydraulic pressure to be supplied to the rear wheel cylinders 7a and 7a.

A sleeve 17 is slidably mounted in the bore 15 concentrically with a portion of the piston 13. Between the sleeve 17 and the housing 8, there is defined an annular chamber 20 which is in fluid communication with the second inlet port 10. In order to assure fluid-tightness between the annular chamber 20 and the bore 15, a pair of axially spaced sealing-member 18 and 19 are mounted on the sleeve 17. At a lower end of the sleeve 17, an inwardly directed flange 17d is formed in the radial direction. Between the flange 17d and an annular shoulder 22 on the piston 13, a tension spring 26 is provided to urge the piston 13 in the upward direction to thereby separate the valve head 21 from the valve seat 24. In order to maintain the sleeve 17 stationary, the following equation controls such an operating condition:

$$Pa \cdot Sa = (Pa \cdot Sb) + (Pb \cdot Sc) + F$$

where
Pa: Hydraulic pressure supplied into the bore 15 from the master cylinder 1 via the first fluid circuit 4,
Sa: Annular area of a lower surface 17b of the sleeve 17,
Sb: Annular area of an upper surface 17c of the sleeve 17,
Pb: Hydraulic pressure supplied into the annular chamber 20 from the master cylinder 1 via the second fluid circuit 3,
Sc: Annular area of the surface 20a of annular chamber 20, and
F : Load of the spring 26.

Figure 2:
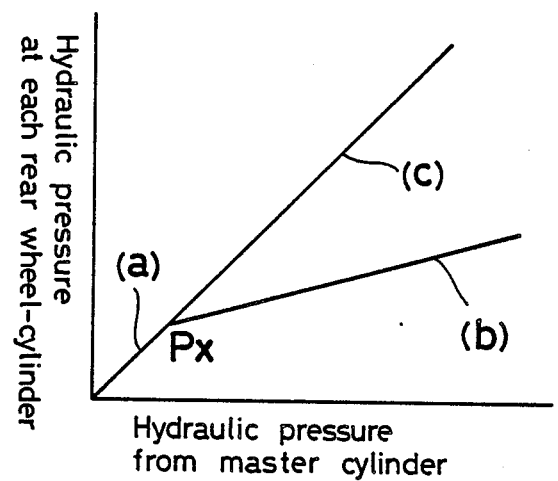
FIG. 2 is a graph showing the characteristic features of a proportioning valve.

In operation, when the foot-pedal 2 of the master cylinder 1 is depressed, the same hydraulic pressure is supplied to the rear wheel-cylinders 7a and 7a via the first fluid circuit 4 and the proportioning valve 6 and to the front wheel cylinders 5a and 5a via conduit 3a of the second fluid conduit 3. During this braking operation, the pressure from the master cylinder 1 is transmitted directly to each rear wheel cylinder 7a as shown by the line (a) in the graph in FIG. 2, but when the hydraulic pressure which is supplied to the first inlet port 11 from the master cylinder 1 exceeds a set value Px, the piston 13 is periodically brought into engagement and disengagement with the valve seat 24, thereby reducing the hydraulic pressure to the wheel cylinders 7a and 7a as shown by the line (b) in the graph in FIG. 2. However, upon fluid-leakage or the like out of second fluid circuit 3, the hydraulic pressure supplied to the annular chamber 20 is reduced to substantially zero. Subsequently, sleeve 17 is moved upwardly and is engaged with an abutting portion 23 of the piston 13 so that downward movement of the piston 13 is prevented. Thus, the valve head 21 of the piston 13 is held in a position spaced from the valve seat 24 and that position is maintained by the sleeve 17. As a result, the pressure supplied to the first inlet port 11 from the master cylinder 1 is transmitted to the rear wheel cylinders 7a and 7a without being reduced as shown by the line (c) in the graph in FIG. 2.

Figure 4:
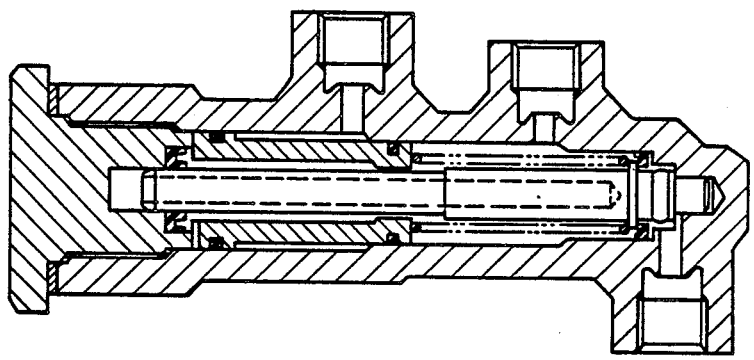
FIG. 4 is a cross-sectional view of a conventional proportioning valve.

In the present invention, the spring 26 is positioned within the sleeve 17 and thus, the axial length of the proportioning valve 6 may be shortened in comparison with the conventional proportioning valve shown in FIG. 4. Further, the point on the upper surface 17a of the sleeve 17 at which force is transmitted to the sleeve 7 by the spring 26 is positioned near the point on the lower surface 17b of the sleeve 17 at which hydraulic pressure is applied to the sleeve 17. Thus, the rotational moment of the sleeve 17 is reduced and smooth movement of the sleeve 17 relative to the piston 13 is possible.

Figure 3:
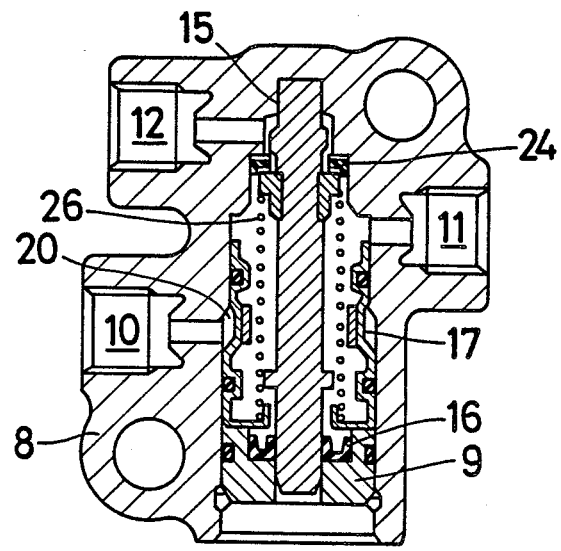
FIG. 3 is a view showing another embodiment of the proportioning valve.

As shown in FIG. 3, the sleeve 17 may be obtained by a pressing manufacturing method.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:
1. A dual hydraulic system for controlling actuation of brake assemblies for wheeled vehicles comprising:
 a brake master cylinder for supplying hydraulic pressure separately to a first fluid circuit and a second fluid circuit;
 two front wheels;
 two front wheel cylinders, each one of said front wheel cylinders being connected to one of the front wheels and being in fluid communication with said brake master cylinder through said second fluid circuit;
 two rear wheels;
 two rear wheel cylinders, each one of said rear wheel cylinders being connected to one of the rear wheels and being in fluid communication with said brake master cylinder through said first fluid circuit;
 proportioning valve means connected between said first circuit and said rear wheel for proportionally reducing the hydraulic pressure supplied to said rear wheels when the hydraulic pressure exceeds a set value; said valve means including:
 a housing;
 a bore formed in said housing;
 an outlet port formed at one side of said housing for establishing fluid communication between said bore and said rear wheel cylinders;
 a first inlet port formed in said housing for establishing fluid communication between said bore and said first fluid circuit;
 a piston having a valve head;
 a valve seat opposed to said valve head;
 a spring engaged at one end with an annular shoulder of said piston to move said valve head away from said valve seat;
 sensing means for sensing fluid leakage in said second fluid circuit; and
 a sleeve slidably mounted in said bore, said sleeve provided with a flange having an upper surface, said sleeve enclosing said spring and receiving an end of said spring opposite to said one end and in contact with said upper surface, said flange having a lower surface which transmits the hydraulic pressure to the sleeve, said upper surface and said lower surface being substantially adjacent to each other, said piston having an abutting portion located intermediate said annular shoulder and said upper surface said sleeve being movable towards said piston so as to cause said upper surface to abut said abutting portion to displace the valve head from the valve seat upon actuation of the sensing means.

2. A dual hydraulic brake system in accordance with claim 1, wherein said sensing means comprises an annular chamber defined between said sleeve and said bore and in fluid communication with said second fluid circuit.

3. A dual hydraluic brake system in accordance with claim 1, wherein said sleeve is a pressed metal sleeve.

* * * * *